United States Patent Office 3,116,185
Patented Dec. 31, 1963

3,116,185
METHOD OF REDUCING THE CAKING OF NITROGEN-CONTAINING COMPOUND
Joseph F. Wilson, Van C. Vives, and John C. Hillyer, Bartlesville, Okla., assignors to Phillips Petroleum Company, a corporation of Delaware
No Drawing. Filed Aug. 18, 1960, Ser. No. 50,312
18 Claims. (Cl. 149—7)

This invention relates to reducing the caking tendency of nitrogen-containing salts. In another aspect, it relates to the production of treated, non-caking nitrogen-containing salts, such as ammonium nitrate, these treated salts being valuable as free-flowing fertilizer with little or no tendency to cake on standing. In another aspect, it relates to nitrogen-containing salts, such as ammonium nitrate, treated to reduce their normal tendency to cake on standing, and to explosive compositions containing such treated salts. In a further aspect, it relates to a novel two-component anti-caking agent, useful in treating such salts, and to a method of preparing such anti-caking agent.

Many nitrogen-containing salts or compounds in powder, crystalline, or granular form have a normal tendency to cake or become sticky on standing and form hard masses. This caking is usually promoted by changes in humidity, temperature, and/or pressure, and occurs under conditions during storing, shipping, and handling.

The tendency of these salts to cake on standing presents difficulties in the handling and use of such salts. For example, where such nitrogen-containing salts are used as fertilizers, this caking tendency impairs the drillability of the fertilizer and increases the effort and cost of uniformly distributing the fertilizer in the field because caked fertilizer causes clogging of distribution machinery and other handling problems. Similarly, where nitrogen-containing salts, such as ammonium nitrate, are used as ingredients in explosive compositions, the caking tendency of such salts adversely affects the sensitivity of the explosive composition. and may render it incapable of satisfactory detonation.

Many methods have been proposed, used or patented in the past for overcoming, reducing, or preventing the normal tendency of such nitrogen-containing salts to cake on standing, including treatment of such salts with various anti-caking, conditioning, or partition agents. While some of these methods and prior art anti-caking agents have been satisfactory in providing some measure of reduced caking, others have proven unsatisfactory because they involve or necessitate complex methods of treatment, or involve the use of large amounts of anti-caking agent which adds to the expense of application. In fact, large amounts of anti-caking agent reduce the nitrogen content of the treated salts and make such treated salt economically unattractive to a farmer who is interested in getting as much plant nutrient value as possible out of the nitrogen-containing salt he buys for use as a fertilizer.

Accordingly, an object of this invention is to reduce the caking of nitrogen-containing salts. Another object is to provide an improved method of treating nitrogen-containing salts, such as ammonium nitrate, to reduce their normal tendency to cake on standing. Another object is to produce treated non-caking nitrogen-containing salts, such as ammonium nitrate, which salts are valuable as free-flowing fertilizers with little or no tendency to cake on standing. Another object is to provide improved explosive compositions containing non-caking nitrogen-containing salts, which explosive compositions are characterized by satisfactory sensitizing and detonation properties. A further object is to provide a novel anti-caking agent, and a novel method of preparing the same. Further objects and advantages of this invention will become apparent to those skilled in the art from the following discussion and appended claims.

We have now discovered that the normal tendency of particulate nitrogen-containing salts, such as ammonium nitrate, to cake on standing can be reduced or prevented by treating such salts with a novel anti-caking agent comprising a major amount of kaolin and a minor amount of an alkali metal salt of an alkylaryl sulfonic acid, said anti-caking agent hereinafter occasionally referred to as the novel two-component anti-caking agent of this invention.

Kaolin, used as a major component of the anti-caking agent of this invention, is a clay whose essential constituent is the mineral kaolinite, a hydrated aluminum silicate. Kaolin is sold as an article of commerce under various trade names, such as Paragon clay, Suprex clay, Barden clay and Barnet clay; a specification of the latter type, having a standard U.S. sieve mesh size of 98% through a 325 mesh screen, is given in Table I. Suprex, Barden, and Barnet clays are all beta-axis disordered, while Paragon is not.

TABLE I

| Component: | Percent by weight |
|---|---|
| Silica as $SiO_2$ | 45.37 |
| Aluminum as $Al_2O_3$ | 37.28 |
| Iron as $Fe_2O_3$ | 1.43 |
| $TiO_2$ | 2.05 |
| CaO | 0.05 |
| MgO | 0.12 |
| $Na_2O$ | 0.21 |
| $K_2O$ | 0.117 |
| Loss on ignition [1] | 13.41 |

[1] The loss on ignition is essentially all chemically combined water.

The alkylaryl sulfonates, employed in a minor amount as the other essential component of the novel anti-caking agents of this invention, are water-soluble alkali metal salts of alkylaryl sulfonic acids which have a total of 7 to 30, preferably 10 to 20, carbon atoms per molecule with preferably 1–4 of these carbon atoms in each of the aliphatic hydrocarbon chains. The aryl portion of these compounds can be either benzene or naphthalene nucleus. These sulfonates can be prepared by the well known procedure of sulfonating the corresponding alkyl aromatic compound and forming the alkali metal salt of the resulting sulfonic acid.

Representative alkylaryl sulfonates useful in the practice of this invention include the sodium salt of 2-butylbenzenesulfonic acid; the sodium salt of 3-tert-dodecylbenzenesulfonic acid; the potassium salt of 4-n-eicosylbenzenesulfonic acid; the potassium salt of 4-n-tetradecylbenzenesulfonic acid; the lithium salt of 4-tetracosylbenzenesulfonic acid; the disodium salt of 6-n-decylbenzene-p-disulfonic acid; the disodium salt of dimethylnaphthalene-1,2-disulfonic acid; the trirubidium salt of 5-tert-hexadecylbenzene-2,4,6-trisulfonic acid; the sodium salt of methylnaphthalenesulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the dicesium salt of 2,5-dimethylbenzene-1,3-disulfonic acid; the disodium salt of 4,6-di-n-decylnaphthalene1,8-disulfonic acid; the potassium salt of 7-tert-dodecylnaphthalene-2-sulfonic acid; the sodium salt of 2,5-dimethylbenzenesulfonic acid; and the like, including mixtures thereof. Of these respective sulfonates, the sodium salts of methylnaphthalenesulfonic acid and dimethylnaphthalenesulfonic acid are preferred, such materials being commercially available.

Both of the components of the novel anti-caking agent of this invention are solids and are inert with respect to the nitrogen-containing salts themselves. The sulfonates are water soluble compounds which may be used in particulate form in treating the nitrogen-containing salts, or applied as an aqueous solution, for example a 5 to 75 wt. percent aqueous solution, preferably about a 50 wt. percent aqueous solution. Said sulfonates are also characterized by the fact that they are not dyestuffs.

The nitrogen-containing salts, in particulate form, are treated with an amount of the novel two-component anti-caking agent of this invention sufficient to reduce the caking tendency of the nitrogen-containing salts. Generally, only a small amount of the anti-caking agent is necessary to provide adequate protection against caking, with amounts in the range of 0.5 to 5 wt. percent of the treated nitrogen-containing salt being generally applicable. As mentioned hereinbefore, the kaolin component comprises a major amount of the anti-caking agent, while the sulfonate component comprises a minor portion of the anti-caking agent. Generally, for most applications, the amount of the sulfonate component in the anti-caking agent will be a synergistic amount, usually within the range between 0.25 and 12 wt. percent, preferably in the narrow range between 0.5 and 5 wt. percent, of the anti-caking agent. Thus, when the anti-caking agent is applied to the nitrogen-containing salt, the amount of sulfonate component in the anti-caking coating can be exceedingly small, e.g., 0.01 wt. percent of the treated nitrogen-containing salt.

The novel anti-caking agent of this invention can be prepared by a variety of methods. For example, a water solution of the sulfonate can be sprayed onto the kaolin, or either of the latter can be slurried up in a solution of the sulfonate. In still another method, the kaolin can be dry-mixed with the sulfonate. In order to insure a homogeneous mixture of the two components, it is preferred to employ some method of violently agitating the mixture, such as a mill like a Waring Blendor in which knife blades shear the material together. Such mixing can be carried out with the aid of a small amount of water, although the kaolin itself may contain some combined water and free water. It is preferred to dry the kaolin to a maximum water content of 10 to 15 wt. percent. The additional water can also be supplied by using an aqueous solution of the sulfonate and spraying such solution on the kaolin.

The kaolin can be dried before being admixed with the sulfonate, or the two-component mixture can be subsequently dried after mixture, or both methods of drying can be used. Whichever drying method is used, the final anti-caking product will normally contain from 0.5 to 8 wt. percent water, preferably 1 to 4 wt. percent water. This novel mixture is then applied to the particulate nitrogen-containing salt by contacting the same therewith, for example by tumbling or other equivalent methods. Generally, the kaolin used will have a particle size finer than 200 mesh, preferably finer than 325 mesh, U.S. standard sieve. The treated or coated nitrogen-containing salt will generally have a moisture content not greater than 0.30 wt. percent, preferably less than 0.20 wt. percent. In most instances the treated nitrogen-containing salt can be subsequently dried further if necessary, or if desired.

We have surprisingly discovered that the treatment of the nitrogen-containing salt with the novel two-component anti-caking agent of this invention reduces the normal caking tendency of the nitrogen-containing salt to a much greater extent than when the nitrogen-containing salt is treated with either the sulfonate itself, or the kaolin itself. Further, we have surprisingly discovered that the combination of a very minor amount of said sulfonate with kaolin is a synergistic combination whose anti-caking characteristics exceed the sum of the anti-caking effect of the sulfonate and the kaolin used alone. The effect of the sulfonate on the anti-caking properties of the kaolin is over and above that predicted from the separate or joint anti-caking effect of the sulfonate and kaolin. We have further discovered that the amount of the novel anti-caking agent of this invention necessary to satisfactorily reduce the caking tendency of the nitrogen-containing salt is comparatively low, with the result that the process of this invention is economically attractive in that the nitrogen content of the treated salt is not appreciably lowered and when such treated salts are used as fertilizer their plant nutrient value remains high. Also, we have discovered that because it only takes a small amount of the anti-caking agent of this invention to insure non-caking of the treated nitrogen-containing salts, the latter, especially treated ammonium nitrate, do not adversely affect the sensitivity of explosive compositions when such treated salts are employed as ingredients of such compositions.

As mentioned above, the alkylaryl sulfonates used in this invention are commercially available. One useful method of preparing such sulfonates is by the sulfonation of cycle oils, and neutralization of the resulting sulfonic acids with an alkali metal hydroxide. This particular method will now be discussed and presented as illustrative of a preferred method for preparing the alkali metal salts of the alkylarylsulfonic acids used in this invention.

Cycle oils which can be used to prepare the sulfonates include those from catalytic cracking units, which cycle oils have a boiling range within the range of from 375 to 700° F. at atmospheric pressure, and which generally contain from 20 to 80 wt. percent aromatics as determined by the silica gel adsorption method of ASTM D936–55, such cycle oils also including concentrates thereof which can be prepared by such means as solvent extraction with liquid $SO_2$ and the like. The sulfonation of the cycle oils can be carried out by contacting the same with a sulfonating agent at a temperature generally in the range of 0 to 100° C., usually between 25 and 75° C. Sulfonating agents which can be used include sulfuric acid, oleum, sulfur trioxide and other well known sulfonating agents. The amount of sulfonating agent employed will vary and be dependent upon such things as the aromatic content of the cycle oil, but generally the sulfonating agent will be employed in amounts within the range of from 0.2 to 5.0 grams per gram of cycle oil.

After sulfonation, the sulfonation mixture can then be neutralized with an alkali metal oxide, hydroxide, or carbonate, preferably with an aqueous solution of the same having a concentration within the range from 10 to 50 wt. percent. The amount of neutralizing agent employed will be that sufficient to effect neutralization and to insure the same an excess of the neutralizing agent will be employed. Generally, the amount of neutralizing agent used will be sufficient to provide from 1 to 2 moles of the same per mole of the sulfonating agent used in the sulfonation step.

Following neutralization of the sulfonic acids, the resulting alkali metal salts can be recovered by any suitable process. Such sulfonates are preferably recovered by extracting the neutralization mixture with water, for example 1 to 10 grams of water per gram of cycle oil charged to the sulfonation reaction. If desired, a suitable dilution step can be employed between the sulfonation and neutralization steps. If a large amount of water is employed in such a dilution step, it may not be necessary to add any additional water after neutralization. The resulting water soluble alkali metal salts of the alkylarylsulfonic acids can then be recovered from the aqueous solution by any suitable process. For example, the aqueous solution can be evaporated or the water removed by means of a azeotrope with methyl alcohol or the like.

As mentioned hereinbefore, the treated nitrogen-containing salts of this invention, especially ammonium nitrate, are useful in explosive compositions where such salts are used in admixture with carbonaceous material. Generally, the explosive compositions of this invention will contain a major amount of the hereindescribed treated nitrogen-containing salt as oxidizer, and a minor amount of carbonaceous material. Usually this will be in the range between 93 to 98 wt. percent of the treated nitrogen-containing salt and 2 to 7 wt. percent of the carbonaceous material. The carbonaceous material employed in preparing these novel explosive compositions include any of those proposed or used heretofore. In particular, the carbonaceous materials we prefer to employ are paraffinic hydrocarbons boiling in the range between 350 and 725° F., with an API gravity of from 20 to 60, and a viscosity of 25 to 140 SUS at 100° F. A specific carbonaceous material of this type is diesel fuel. Other known solid carbonaceous materials which can be employed include ground walnut hulls, asphalt, pitch, kerosene, coal tar, and the like. Liquid carbonaceous materials are preferred.

Although the subject invention is of particular value in treating ammonium nitrate, it should be understood that this invention is not limited thereto but includes treating any nitrogen-containing salt which normally tends to cake on standing. Such other salts representatively include sodium, potassium, and calcium nitrates, monoammonium sulfate, ammonium sulfate, urea, and the like, including mixtures thereof. These nitrogen-containing salts can be treated or coated according to this invention in particulate form, e.g., prills, grains, crystals, beads, etc. An example of a useful mesh size, of prilled ammonium nitrate, is between 8 and 14 mesh, U.S. standard sieve.

Although the novel two-component anti-caking agent of this invention when used by itself is sufficient to satisfactorily reduce or prevent the normal caking tendency of nitrogen-containing salts treated therewith, it is also within the scope of this invention to utilize other known anti-caking agents in combination with the two-component agent of this invention.

Further objects and advantages of this invention will be apparent from the following examples; however, the subject invention is not to be unduly construed as limited by these examples or to the ingredients, amounts, temperatures, etc., expressed in these examples, since the same are set forth merely for illustrative purposes.

*Example I*

Alkali metal alkylaryl sulfonates useful in the practice of this invention were prepared by a series of runs in which several different refinery streams which contained aromatic hydrocarbons (primarily alkyl naphthalenes) were sulfonated and the resulting alkylaryl sulfonic acids neutralized to yield the corresponding sulfonates.

In these runs, an amount of the hydrocarbon to be sulfonated was charged to a 3-necked, 1-liter, round-bottomed flask which was fitted with a stirrer, a thermometer and a dropping funnel. In each run, an amount of fuming sulfuric acid was charged to the flask by means of the dropping funnel, and an ice bath was employed to maintain the temperature of the reaction mixture between 17 and 20° C. during the acid addition. After all of the acid had been added, the ice bath was removed and an electric heating mantle was placed around the flask. The mixture was then heated to 65–66° C. for 60–70 minutes while stirring, after which 300 grams of ice was added to the sulfonation reaction mixture containing the alkylaryl sulfonic acids. An amount of aqueous sodium hydroxide solution was then added dropwise until the pH of the sulfonation mixture reached 8. During the addition of caustic, the temperature was maintained below 30° C. by means of an ice bath.

At the end of neutralization in each run, the oil layer was decanted off. Approximately one liter of methyl alcohol was then added to the water layer. The methyl alcohol-water solution was then heated to drive off a methyl alcohol-water azeotrope, and the remaining dark slurry comprising sodium alkylaryl sulfonates was subjected to drying in a vacuum oven at 65° C. and a maximum vacuum of 15″ Hg absolute.

Runs 1 and 2 were light cycle oils and that used in run 3 was a light fraction of one of these cycle oils.

Light cycle oil #1 was obtained from a fluid catalytic cracking unit which was operated at a high recycle ratio, and this cycle oil had the following characteristics.

ASTM: Distillation, ° F.
IBP _____ 412
10% _____ 448
50% _____ 474
90% _____ 507
EP _____ 552

API gravity _____ 22.3
Calculated BMCI _____ 73.2
Estimated wt. percent aromatics _____percent__ 50

Light cycle oil #2 was obtained from a fluid catalytic cracking unit and it had the following characteristics.

ASTM: Distillation, ° F.
IBP _____ 424
10% _____ 489
20% _____ 501
30% _____ 511
40% _____ 521
50% _____ 529
60% _____ 542
70% _____ 554
80% _____ 566
90% _____ 584
EP _____ 624

API gravity _____ 31.6
Calculated BMCI _____ 43.7
Weight percent aromatics by ASTM D936–55 _____percent__ 25.2

Light cycle oil #2A was a fore fraction of light cycle oil #2. This stream was fractionated at 50 mm. Hg absolute pressure. The fractionation data are as follows:

| Fraction | Head temp., ° F. | Refractive index $n_D^{20}$ |
| --- | --- | --- |
| 1 | 68–230 | 1.4750 |
| 2 | 230–302 | 1.4910 |
| 3 | 302–320 | 1.4965 |
| 4 | 320–361 | 1.4995 |

The first three fractions, representing 27.8 weight percent of the total cycle oil, were combined, sulfonated, and neutralized as described above.

The results of sulfonating and neutralizing the above-described refinery streams are expressed below as Table II.

TABLE II

| Run No. | Hydrocarbon stream | Charge, grams | | | Recovered from neutralized mixture, grams | | |
| --- | --- | --- | --- | --- | --- | --- | --- |
| | | Oil | Fuming H$_2$SO$_4$ | 35% aq. NaOH | Unsulfonated oil | Na$_2$SO$_4$ | Sodium alkylaryl sulfonate |
| 1 | Light cycle oil #1 | 100 | 150 | 300 | 27 | 135 | 135 |
| 2 | Light cycle oil #2 | 400 | 150 | 300 | 295 | 144 | 145 |
| 3 | Light cycle oil #2A | 170 | 150 | 300 | 83 | 157 | 105 |

*Example II*

The sulfonates prepared in Example I were evaluated as anti-caking agents for nitrogen-containing salts in the following manner.

In these runs, the sodium alkylaryl sulfonate was applied to a kaolin clay (Barnet clay) by contacting the clay with a 50% by weight aqueous solution of the sulfonate. After the sulfonate had been applied to the clay, the treated clay (containing 3 wt. percent of said sulfonate) was then tumbled onto commercial ammonium nitrate prills. The tumbling time was approximately 10 minutes.

The moisture content of the treated ammonium nitrate prills was then determined, after which the treated nitrate was tested for caking by a test hereinafter referred to as the "cake test."

In this test, 65 gram portions of the treated nitrate was poured into polyethylene cylinders fabricated from two layers of 1½ mil wall thickness polyethylene. The inside diameters of the cylinders were 1⅞ inches, and the ends of the cylinders were plugged with Lucite blocks ½ inch thick. The blocks were held in the cylinders by means of cellophane tape. The loaded cylinders were then placed in a brass mold containing 3 holes, each 4 inches deep and 2 inches in diameter. A bellows was then attached to the top of the mold so as to supply 24 p.s.i. air pressure to the nitrate particles in the cylinders. The entire arrangement was then placed in an oven and maintained at 140° F. for 18 hours. The mold was then removed from the oven and opened, and the nitrate cakes which had been formed were removed from the cylinders. The cross-sectional area of each cake was 2.75 square inches. The cakes were then tested to breaking or crushing in a Carver commercial press, and the pressure required to break each cake was recorded. The pressure in p.s.i. was then calculated and recorded. This cake-breaking procedure is a modification of the test procedure described in Ind. & Eng. Chem. 33, 121–127 (1941). The results of these tests are expressed below as Table III.

TABLE III

| Run No. | Source of sulfonate* | Amt. of coating agent applied, wt. percent | Moisture of coated product, wt. percent | Av. crushing strength of coated product, p.s.i. |
|---|---|---|---|---|
| 1 | Cycle oil #1 | 0.5 | 0.13 | 0 |
| 2 | do | 1 | 0.21 | 0 |
| 3 | do | 1 | 0.21 | 0 |
| 4 | do | 1 | 0.13 | 0 |
| 5 | do | 1 | 0.13 | 0 |
| 6 | do | 1 | 0.08 | 0 |
| 7 | do | 1 | 0.08 | 0 |
| 8 | Cycle oil #2 | 1 | 0.19 | 0 |
| 9 | do | 1 | 0.16 | 0 |
| 10 | do | 1 | 0.14 | 0 |
| 11 | do | 2 | 0.15 | 0 |
| 12 | Cycle oil #3 | 1 | 0.18 | 0 |
| 13 | do | 1 | 0.15 | 0 |
| 14 | do | 1 | 0.08 | 0 |

*See Example I and Table II.

The data of Table III show that treatment of the nitrogen-containing salt with the alkali metal alkylaryl sulfonate-kaolin anti-caking agent of this invention completely prevented the normal tendency of said nitrogen-containing salt to cake on standing.

*Example III*

A number of runs were carried out in which the sodium salt of methylnaphthalene sulfonic acid was admixed with kaolin to prepare the novel anti-caking agent of this invention, after which a particulate nitrogen-containing salt was contacted with said agent to reduce the normal tendency of said salt to cake on standing.

In each of these runs, a 50 weight percent aqueous solution of said sulfonate was sprayed onto a kaolin clay in an amount sufficient to provide a sulfonate-kaolin mixture containing 3 weight percent of said sulfonate. Rapid agitation was employed to insure homogeneity, and the mixture was then dried. The dried two-component coating agent was then tumbled onto commercial ammonium nitrate prills for approximately 10 minutes. The moisture content of the treated prills was then determined, after which the treated prills were evaluated according to the "cake test" described in Example II.

For purposes of comparison, similar runs were carried out in which ammonium nitrate prills were contacted individually with the sulfonate and kaolin. The treated prills of these runs were also evaluated by the "cake test." For further purposes of comparison, untreated prills (control) were evaluated by the "cake test."

The results of these runs and cake tests are set forth in Table IV.

TABLE IV

| Run No. | Coating agent | Type of kaolin* | Amt. of coating agent applied, wt. percent | Moisture content of treated product, wt. percent | Av. crushing strength of treated product, p.s.i. |
|---|---|---|---|---|---|
| 1 | None (control) | | 0 | 0.18 | 383 |
| 2 | do | | 0 | 0.19 | 400 |
| 3 | do | | 0 | 0.20 | 415 |
| 4 | do | | 0 | 0.21 | 435 |
| 5 | do | | 0 | 0.22 | 460 |
| 6 | do | | 0 | 0.23 | 485 |
| 7 | do | | 0 | 0.24 | 510 |
| 8 | do | | 0 | 0.25 | 545 |
| 9 | do | | 0 | 0.26 | 580 |
| 10 | do | | 0 | 0.27 | 615 |
| 11 | Sulfonate | | 0.03 | 0.17 | 276 |
| 12 | Kaolin | A | 1 | 0.08 | 20 |
| 13 | do | A | 1 | 0.16 | 340 |
| 14 | do | A | 1 | 0.22 | 500+ |
| 15 | do | A | 3 | 0.22 | 500+ |
| 16 | do | B | 1 | 0.08 | 20 |
| 17 | do | B | 1 | 0.17 | 120 |
| 18 | do | B | 1 | 0.22 | 500+ |
| 19 | do | B | 3 | 0.22 | 500+ |
| 20 | do | C | 1 | 0.08 | 155 |
| 21 | do | C | 1 | 0.25 | 600+ |
| 22 | do | C | 3 | 0.08 | 110 |
| 23 | do | C | 3 | 0.25 | 400 |
| 24 | do | D | 1 | 0.08 | 170 |
| 25 | do | D | 1 | 0.25 | 600+ |
| 26 | do | D | 3 | 0.08 | 125 |
| 27 | do | D | 3 | 0.25 | 600+ |
| 28 | Kaolin+sulfonate | A | 1 | 0.10 | 0 |
| 29 | do | A | 1 | 0.16 | 0 |
| 30 | do | A | 1 | 0.20 | 0 |
| 31 | do | B | 1 | 0.10 | 0 |
| 32 | do | B | 1 | 0.16 | 0 |
| 33 | do | B | 1 | 0.20 | 0 |
| 34 | do | C | 1 | 0.10 | 0 |
| 35 | do | C | 1 | 0.21 | 0 |
| 36 | do | D | 1 | 0.10 | 0 |
| 37 | do | D | 1 | 0.20 | 0 |

*A=Paragon Clay. B=Suprex Clay. C=Barnet Clay. D=Barden Clay.

The data of Table IV show that the two-component anti-caking agent of this invention (run Nos. 28–37) is superior to either individual component in preventing the caking of the nitrogen-containing salt (ammonium nitrate.) Further, such data show that the anti-caking effect of the combination of the two components is synergistic.

*Example IV*

In this example, a kaolin (Barnet Clay) was dry mixed with 3 weight percent of the sulfonate of Example III, and the mixture tumbled with ammonium nitrate prills. An amount of this kaolin was also mixed with 3 weight percent of said sulfonate and sufficient water to form a 50% slurry, which was dried, broken up, and similarly tumbled with ammonium nitrate prills. These treated samples were evaluated by the "cake test," and the result thereof, together with a control, are set forth in Table V.

TABLE V

| Run No. | Method of preparing coating agent | Amt. of coating agent applied, wt. percent | Moisture content of treated product, wt. percent | Av. crushing strength of treated product, p.s.i. |
|---|---|---|---|---|
| 1 (control) | | 0 | 0.22 | 460 |
| 2 | Dry mixed | 1 | 0.22 | 30 |
| 3 | Mixed as slurry | 1 | 0.22 | 180 |

The data of Table V show that alternative methods of preparing the novel two-component anti-caking agents of this invention can be used, and that nitrogen-containing salts treated with such agents will effectively reduce the normal caking tendency of such salts.

Example V

The synergistic activity of the two-component anti-caking agent of this invention is graphically demonstrated by the following example.

In each of a plurality of runs, 250 grams of prilled ammonium nitrate were tumbled with various treating materials for 10 minutes in a wide mouth quart bottle at a speed of 78 r.p.m. After treatment, 65 grams of the treated ammonium nitrate sample were evaluated by the above-described "cake test," the excess portion of the treated sample being used for moisture analyses. Triplicate runs were made with each treating material. For purposes of comparison, untreated ammonium nitrate samples were also evaluated in triplicate runs. Results of these evaluations are set forth in Table VI.

TABLE VI

| Run No. | Coating agent | Amt. of coating agent applied, wt. percent | Moisture content of coated product, wt. percent | Crushing strength of coated product, p.s.i. | |
|---|---|---|---|---|---|
| 1 | None (control) | 0 | 0.14 | 480 | |
| 2 | ----do---- | 0 | 0.14 | 420 | av. 450 |
| 3 | ----do---- | 0 | 0.14 | 450 | |
| 4 | Kaolin a | 1 | 0.13 | 320 | |
| 5 | ----do.a---- | 1 | 0.13 | 310 | av. 320 |
| 6 | ----do.a---- | 1 | 0.13 | 330 | |
| 7 | Sulfonate b | 1 | 0.19 | 150 | |
| 8 | ----do.b---- | 1 | 0.19 | 120 | av. 140 |
| 9 | ----do.b---- | 1 | 0.19 | 150 | |
| 10 | Kaolin+sulfonate c | 1 | 0.13 | 0 | |
| 11 | ----do.c---- | 1 | 0.13 | 0 | av. 0 |
| 12 | ----do.c---- | 1 | 0.13 | 0 | | a Barnet Clay.
b A commercial alkylnapththalene sulfonate (Na salt) of this invention.
c Barnet Clay containing 2.9 wt. percent of same sulfonate used in Run Nos. 7–9, the combination prepared by spraying a solution of the sulfonate of the kaolin.

Examination of the data of Table VI shows that the two-component combination anti-caking agent of this invention (run Nos. 10–12) is truly synergistic in that its combined anti-caking effect exceeds the anti-caking effect of the components (kaolin and sulfonate) used above (run Nos. 4–9).

Various modifications and alterations of this invention will become apparent to those skilled in the art without departing from the scope and spirit of this invention, and the foregoing discussion and examples should not be construed to unduly limit this invention.

We claim:

1. A method of reducing the normal tendency of a particulate nitrogen-containing compound to cake on standing, said compound being selected from the group consisting of ammonium, sodium, potassium, and calcium nitrates, monoammonium sulfate, ammonium sulfate, and urea, which comprises coating said compound with a material which comprises, as the sole essential anti-caking agent, an admixture of a major amount of kaolin and a minor amount of an alkali metal salt of an alkylaryl sulfonic acid, said agent being employed in an amount sufficient to reduce the normal tendency of said nitrogen-containing compound to cake on standing.

2. A method according to claim 1 wherein said alkylaryl sulfonic acid has a total of 7 to 30 carbon atoms per molecule, and where the aryl portion of the molecule is selected from the group consisting of benzene and naphthalene groups.

3. A method according to claim 2 wherein said alkali metal salt is the sodium salt of an alkylbenzenesulfonic acid.

4. A method according to claim 2 wherein said alkali metal salt is the sodium salt of an alkylnaphthalensulfonic acid.

5. A method according to claim 1 wherein said nitrogen-containing compound is ammonium nitrate.

6. A method according to claim 1 wherein the amount of said agent employed is in the range of about 0.5 to 5 weight percent of the coated compound, and said alkali metal salt amounts to about 0.25 and 12 weight percent of said agent.

7. A method of reducing the normal tendency of particulate ammonium nitrate salt to cake on standing, which comprises coating said salt with a material which comprises, as the sole essential anti-caking agent, 0.5 to 5 weight percent, based on the coated salt, of an admixture of kaolin and from 0.25 to 12 weight percent of the agent of the sodium salt of an alkylaryl sulfonic acid having a total of from 7 to 30 carbon atoms per molecule wherein the aryl portion of said molecule is selected from the group consisting of benzene and naphthalene groups.

8. A method according to claim 7 wherein said alkylaryl sulfonic acid is methylnaphthalenesulfonic acid.

9. A method according to claim 7 wherein said alkylaryl sulfonic acid is dimethylnaphthalenesulfonic acid.

10. A method according to claim 7 wherein said anti-caking agent is prepared by spraying an aqueous solution of said sodium salt onto said kaolin, agitating the resulting mixture, drying the same, and tumbling the same in particle form with said ammonium nitrate.

11. As a new composition of matter, a particulate nitrogen-containing compound coated with a material which comprises, as the sole essential anit-caking agent, an admixture of a major amount of kaolin and a minor amount of an alkali metal salt of an alkylaryl sulfonic acid, said agent being employed in an amount sufficient to reduce the normal tendency of said nitrogen-containing compound to cake on standing, said compound being selected from the group consisting of ammonium, sodium, potassium, and calcium nitrates, monoammonium sulfate, ammonium sulfate, and urea.

12. As a new composition of matter, particulate ammonium nitrate coated with a material which comprises, as the sole essential anti-caking agent, 0.5 to 5 weight percent, based on the coated ammonium nitrate, of an admixture of kaolin and from 0.25 to 12 weight percent of the agent of the sodium salt of an alkylaryl sulfonic acid having a total of from 7 to 30 carbon atoms per molecule wherein the aryl portion of said molecule is selected from the group consisting of benzene and naphthalene groups.

13. An explosive composition comprising a major amount of coated ammonium nitrate and a minor amount of a combustible carbonaceous material, said coated ammonium nitrate being coated with a material which comprises, as the sole essential anti-caking agent, 0.5 to 5 weight percent, based on the coated ammonium nitrate, of an admixture of kaolin and from 0.25 to 12 weight percent of the agent of the sodium salt of an alkylaryl sulfonic acid having a total of from 7 to 30 carbon atoms per molecule wherein the aryl portion of said molecule is selected from the group consisting of benzene and naphthalene groups.

14. A method of reducing the normal tendency of ammonium nitrate prills to cake on standing, which comprises coating said prills with an anti-caking agent consisting essentially in admixture of a major amount of kaolin and a minor amount of the sodium salt of a methylnaphthalenesulfonic acid, said agent being employed in an amount sufficient to reduce the normal tendency of said prills to cake on standing.

15. As a new composition of matter, ammonium nitrate prills coated with a material which comprises, as the sole essential anti-caking agent, an admixture of a major amount of kaolin and a minor amount of the sodium salt of a methylnaphthalenesulfonic acid, said agent being employed in an amount sufficient to reduce the normal tendency of said prills to cake on standing.

16. An explosive composition comprising a major amount of coated ammonium nitrate prills and a minor amount of a combustible carbonaceous material, said prills being coated with a material which comprises, as the sole essential anti-caking agent, an admixture of a major amount of kaolin and a minor amount of the sodium salt of a methylnaphthalenesulfonic acid, said agent being employed in an amount sufficient to reduce the normal tendency of said prills to cake on standing.

17. An explosive composition according to claim 16, wherein said combustible carbonaceous material comprises paraffinic hydrocarbons being in the range between about 350 and 725° F., having an API gravity of from about 20 to 60, and a viscosity of from about 25 to 140 SUS at 100° F.

18. An explosive composition according to claim 16, wherein said combustible carbonaceous material comprises diesel fuel.

References Cited in the file of this patent
UNITED STATES PATENTS

| | | |
|---|---|---|
| 2,238,651 | Keenen | Apr. 15, 1941 |
| 2,314,091 | Jones | Mar. 16, 1943 |
| 2,586,709 | Phillips | Feb. 19, 1952 |
| 2,616,786 | Whetstone | Nov. 4, 1952 |
| 2,644,769 | Robinson | July 7, 1953 |
| 2,720,446 | Whetstone et al. | Oct. 11, 1955 |
| 2,728,732 | Arnett et al. | Dec. 27, 1955 |
| 2,739,036 | Kamenjar et al. | Mar. 20, 1956 |
| 2,782,096 | Ames | Feb. 19, 1957 |
| 2,794,701 | Ames et al. | June 4, 1957 |
| 2,814,555 | Rinkenbach et al. | Nov. 26, 1957 |
| 2,817,581 | Rinkenbach et al. | Dec. 24, 1957 |
| 2,866,760 | Haessler et al. | Dec. 30, 1958 |
| 2,879,133 | Marti | Mar. 24, 1959 |